(12) United States Patent
Ono

(10) Patent No.: US 9,336,468 B2
(45) Date of Patent: May 10, 2016

(54) IMAGE FORMING APPARATUS, IMAGE FORMING METHOD, AND MEDIUM

(71) Applicant: CANON KABUSHIKI KAISHA, Tokyo (JP)

(72) Inventor: Takashi Ono, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/320,811

(22) Filed: Jul. 1, 2014

(65) Prior Publication Data

US 2015/0009540 A1 Jan. 8, 2015

(30) Foreign Application Priority Data

Jul. 4, 2013 (JP) .................................. 2013-140528
Jun. 18, 2014 (JP) .................................. 2014-125507

(51) Int. Cl.
- *G06K 9/34* (2006.01)
- *G06K 15/00* (2006.01)
- *H04N 1/46* (2006.01)
- *G06K 15/02* (2006.01)

(52) U.S. Cl.
CPC ........ *G06K 15/1822* (2013.01); *G06K 15/1813* (2013.01); *G06K 15/1847* (2013.01)

(58) Field of Classification Search
None
See application file for complete search history.

(56) References Cited

U.S. PATENT DOCUMENTS

| 6,351,558 | B1 | 2/2002 | Kuwata | |
|---|---|---|---|---|
| 6,539,111 | B2 | 3/2003 | Kuwata | |
| 6,754,381 | B2 | 6/2004 | Kuwata | |
| 7,155,060 | B2 | 12/2006 | Kuwata | |
| 7,512,263 | B2 | 3/2009 | Kuwata | |
| 2003/0132943 | A1* | 7/2003 | Guleryuz et al. | 345/581 |
| 2006/0092475 | A1* | 5/2006 | Kaburagi | 358/3.27 |
| 2006/0170979 | A1* | 8/2006 | Hasegawa et al. | 358/3.27 |
| 2007/0109583 | A1* | 5/2007 | Yoneoka | 358/1.13 |
| 2008/0018942 | A1* | 1/2008 | Komiya | 358/3.28 |
| 2008/0094649 | A1* | 4/2008 | Jeong | 358/1.11 |
| 2009/0257099 | A1* | 10/2009 | Sato et al. | 358/474 |

(Continued)

FOREIGN PATENT DOCUMENTS

| JP | 2001-069360 A | 3/2001 |
|---|---|---|
| JP | 2003-085546 A | 3/2003 |

OTHER PUBLICATIONS

JPA5_2003-85546, published on Jan. 20, 2005, which shows amendment to JP 2003-085546 A under the provision of Section 17bis of the Japanese Patent Law.

*Primary Examiner* — Marivelisse Santiago Cordero
*Assistant Examiner* — Moustapha Diaby
(74) *Attorney, Agent, or Firm* — Fitzpatrick, Cella, Harper & Scinto

(57) ABSTRACT

The image forming apparatus includes a PDL analysis unit, a DL generation unit, an edge enhancement determination unit configured to determine whether or not to perform edge enhancement processing for each image, an edge enhancement unit configured to perform edge enhancement processing, and a development processing unit configured to develop a DL into a bitmap. The DL generation unit generates a DL for image data within PDL data on which edge enhancement processing is not performed in the case where the edge enhancement determination unit determines not to perform edge enhancement processing, and generates a DL for image data within PDL data on which edge enhancement processing is performed in the case where the edge enhancement determination unit determines to perform edge enhancement processing.

8 Claims, 14 Drawing Sheets

(56) References Cited

U.S. PATENT DOCUMENTS

| | | | |
|---|---|---|---|
| 2009/0284801 A1* | 11/2009 | Sakaue et al. | 358/3.27 |
| 2010/0079818 A1* | 4/2010 | Seo | 358/3.24 |
| 2010/0238468 A1* | 9/2010 | Eguchi | 358/1.9 |
| 2010/0246939 A1* | 9/2010 | Aisaka et al. | 382/156 |
| 2010/0265549 A1* | 10/2010 | Kashibuchi et al. | 358/3.06 |
| 2011/0142363 A1* | 6/2011 | Nojima et al. | 382/260 |

* cited by examiner

| EDGE ENHANCEMENT INTENSITY SETTING VALUE | IMAGE RESOLUTION Td | OUTPUT WIDTH AND HEIGHT Ts | NUMBER OF COLORS Tc |
|---|---|---|---|
| 0 | 200dpi | 3cm | 16 |
| 1 | 400dpi | 2cm | 16 |
| 2 | 600dpi | 1cm | 256 |

FIG.14

IMAGE FORMING APPARATUS, IMAGE FORMING METHOD, AND MEDIUM

BACKGROUND OF THE INVENTION

1. Field of the Invention

The present invention relates to an image forming apparatus, an image forming method, and a medium for performing image processing.

2. Description of the Related Art

In recent years, the digital camera has spread and the number of pieces of electronized image data is increasing. These pieces of image data are taken into a PC and attached to a document together with text and graphics using an application on the PC.

In the case where printing of a document including these pieces of image data is performed on an application of a computer, a printer driver converts the document into print data (PDL data) in the page description language (PDL) format. Next, the PDL data is transmitted to a printing device (e.g., printer) connected with the computer via a network and printing is performed. In the printer driver, settings of resolution, color conversion, etc., can be performed, and therefore, it is made possible to perform printing by appropriate image processing. Further, in the printing device also, image processing, such as color processing and edge enhancement, is performed on a bitmap image obtained by performing rendering on the PDL data.

FIG. 3 is a flowchart showing an outline of a flow of conventional processing of PDL data.

Image data before resolution conversion included in PDL data is subjected to data analysis at step S401, and at step S402, is subjected to image processing, such as CMS. Next, at step S403, intermediate data (Display List, abbreviated to DL in the present specification) is generated. Next, at step S404, the generated DL is subjected to rendering. At the time of rendering, at step S405, the resolution of the image data is converted into an output resolution. Next, the edge of a bitmap generated by rendering is enhanced at step S406, and at step S407, the color is converted (e.g., conversion from RGB into CMYK) and at step S408, printing is performed.

In the processing shown in FIG. 3, the resolution of the bitmap after being subjected to rendering is high, and therefore, it is desirable to increase the rate by using hardware. Further, for the image processing, the method for determining the kind of an image based on the number of colors and automatically switching color processing based on the determination has been proposed (e.g., see Japanese Patent Laid-Open No. 2003-085546).

SUMMARY OF THE INVENTION

However, in the case where edge enhancement processing is performed on the bitmap after being subjected to rendering as described previously, the edge enhancement processing is performed, as a result, after the resolution of the image data is converted into the output resolution. For example, in the case where the output resolution (first resolution) is higher than the resolution (second resolution) of the image data, the effect of performing edge enhancement processing on the image data of the first resolution is subtle compared to the effect of performing edge enhancement processing on the image data of the second resolution in terms of edge enhancement and there is a case where a vivid output result is not obtained.

The invention described in claim 1 of the present application is an image forming apparatus including an edge enhancement unit configured to enhance an edge part of image data included in PDL data and a drawing unit configured to draw an image of data generated based on the results of analyzing image data after being subjected to edge enhancement processing by the edge enhancement unit and the PDL data.

At the time of printing of PDL data, whether to perform edge enhancement processing on image data within the PDL data is determined for each image and edge enhancement processing is skipped for image data other than image data that meets conditions. By doing so, it is possible to avoid a reduction in performance and improper drawing due to edge enhancement processing, and to implement edge enhancement processing with a significant edge enhancement effect. Further, by selecting edge enhancement processing and the most appropriate compression method in the information processing apparatus for generating PDL data, it is possible to implement higher-rate printing processing while maintaining the edge enhancement effect.

Further features of the present invention will become apparent from the following description of exemplary embodiments (with reference to the attached drawings).

BRIEF DESCRIPTION OF THE DRAWINGS

FIG. 14 is a diagram showing an example of a table including each threshold for an edge enhancement intensity setting value.

DESCRIPTION OF THE EMBODIMENTS

Figure 1:
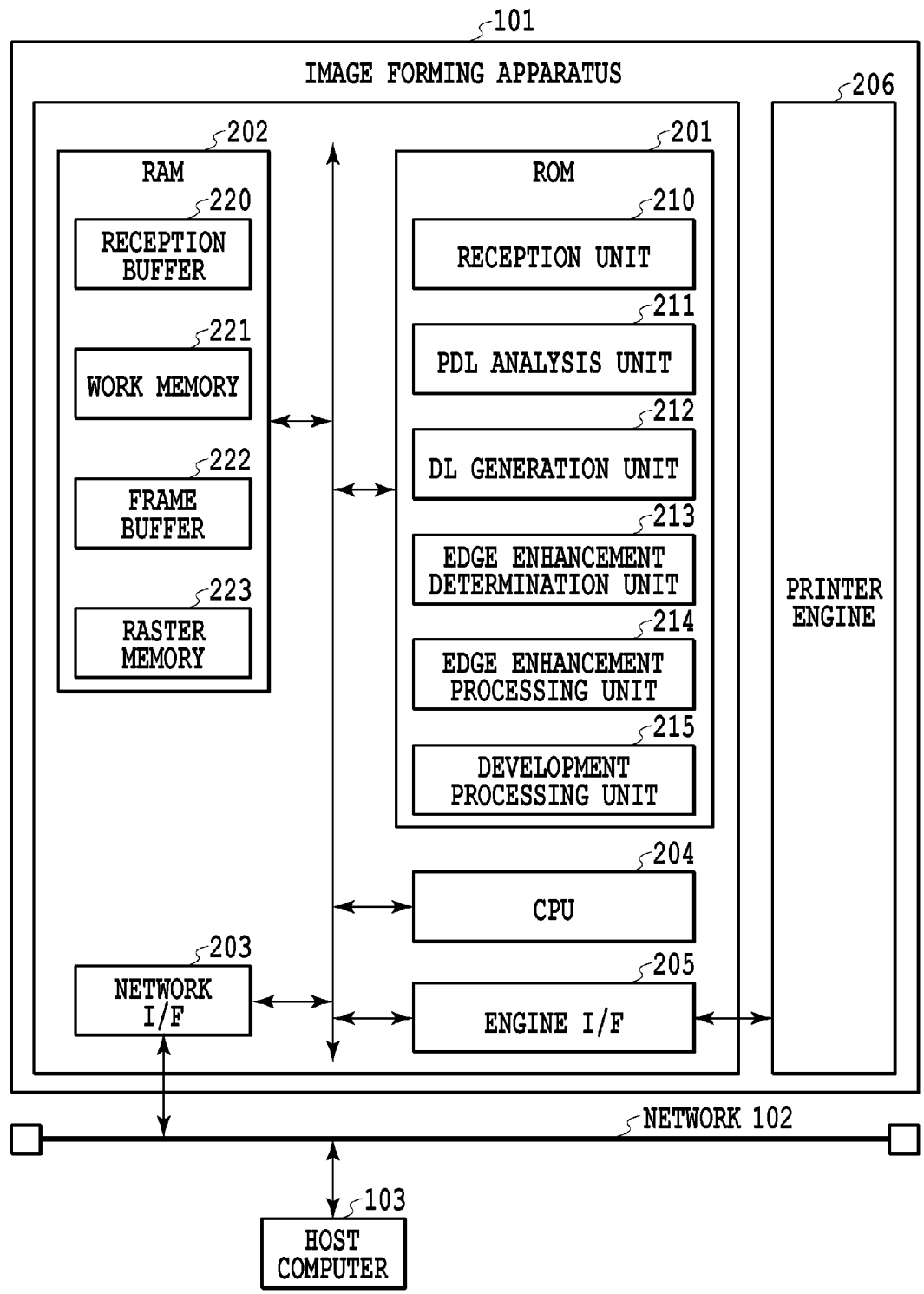
FIG. 1 is a block diagram showing an example of a system configuration of an image forming apparatus 101 in the present invention.

FIG. 1 is a block diagram showing an example of a system configuration of an image forming apparatus 101 in the present invention.

As shown in FIG. 1, the image forming apparatus 101 includes a ROM 201, a RAM 202, a network I/F 203, a CPU 204, an engine I/F 205, and a printer engine 206.

The image forming apparatus 101 is connected with a host computer 103 via a network 102. The image forming apparatus 101 transmits information to the host computer 103 via the network 102 and receives information from the host computer 103.

The ROM 201 is a nonvolatile storage medium for storing control codes of the CPU 204 in the image forming apparatus 101. The ROM 201 includes a reception unit 210, a PDL analysis unit 211, a DL generation unit 212, an edge enhancement determination unit 213, an edge enhancement processing unit 214, and a development processing unit 215.

The RAM 202 is a volatile storage medium for temporarily storing various kinds of information. The RAM 202 includes a reception buffer 220, a work memory 221, a frame buffer 222, and a raster memory 223.

The network I/F 203 is an interface through which to input and output information from and to the host computer 103 via the network 102. The network I/F 203 receives PDL data transmitted from the host computer 103.

The CPU 204 performs arithmetic operation processing performed in the image forming apparatus 101. The CPU 204 functions as the reception unit, the PDL analysis unit, the DL generation unit, the edge enhancement determination unit, the edge enhancement processing unit, or the development processing unit by reading and executing the control code stored in the ROM 201.

The engine I/F 205 is an interface through which to input and output signals from and to the printer engine 206.

The printer engine 206 forms a latent image on a photosensitive drum by the widely-known electrophotographic process based on image data and performs printing by transferring the latent image to a sheet and fixing the image.

The CPU 204 functions as the reception unit by reading and executing the control code stored in the reception unit 210 and stores the PDL data received by the network I/F 203 in the reception buffer 220.

The CPU 204 functions as the PDL analysis unit by reading and executing the control code stored in the PDL analysis unit 211, and analyzes the command of the PDL data stored in the reception buffer 220 and requests the DL generation unit to generate a DL.

The CPU 204 functions as the DL generation unit by reading and executing the control code stored in the DL generation unit 212. The DL generation unit is requested to generate a DL by the PDL analysis unit. The DL generation unit generates a DL and stores the DL in the frame buffer 222.

The CPU 204 functions as the edge enhancement determination unit 213 by reading and executing the control code stored in the edge enhancement determination unit 213. In the case where the request to generate a DL from the PDL analysis unit 211 is a request to generate a DL for image data, the edge enhancement determination unit 213 determines whether or not to perform edge enhancement processing for each image.

The CPU 204 functions as the edge enhancement processing unit by reading and executing the control code stored in the edge enhancement processing unit 214. The edge enhancement processing unit 214 performs edge enhancement processing on image data based on the determination result of the edge enhancement determination unit 213. It may also be possible to perform edge enhancement processing on image data in the edge enhancement processing unit 214 without determining the image data in the edge enhancement determination unit 213.

The CPU 204 functions as the development processing unit by reading and executing the control code stored in the development processing unit 215, and develops the DL generated by the DL generation unit and stored in the frame buffer 222 and stores a bitmap in the raster memory 223.

In the reception buffer 220, PDL data received via the network I/F 203 is stored.

The work memory 221 is used temporarily at the time of analysis processing by the PDL analysis unit or DL generation processing by the DL generation unit.

In the frame buffer 222, the DL generated by the DL generation unit is stored.

In the raster memory 223, the bitmap developed by the development processing unit from the DL stored in the frame buffer 222 is stored.

Figure 2:
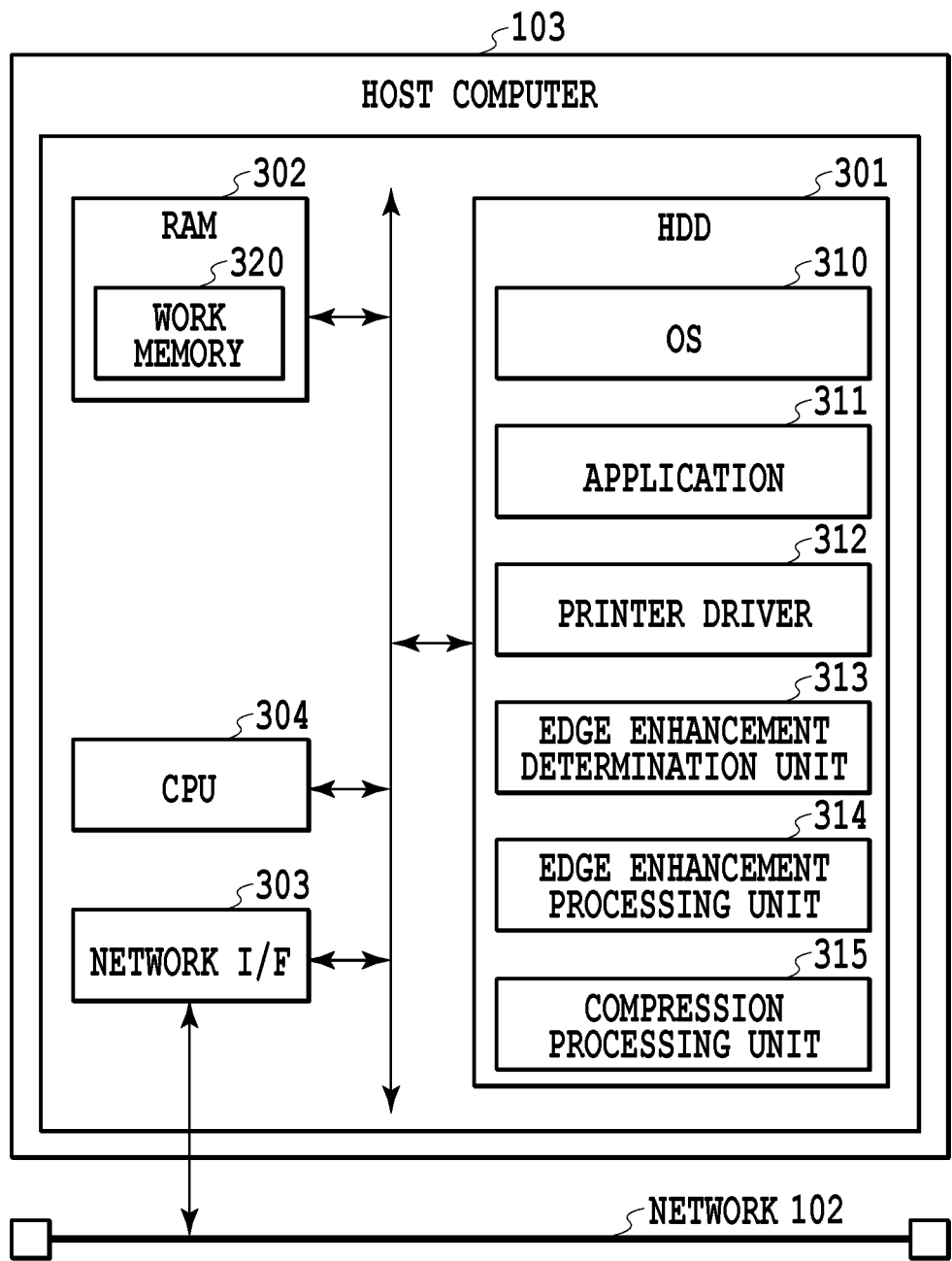
FIG. 2 is a block diagram showing an example of a system configuration of a host computer 103 in the present invention.
Figure 3:
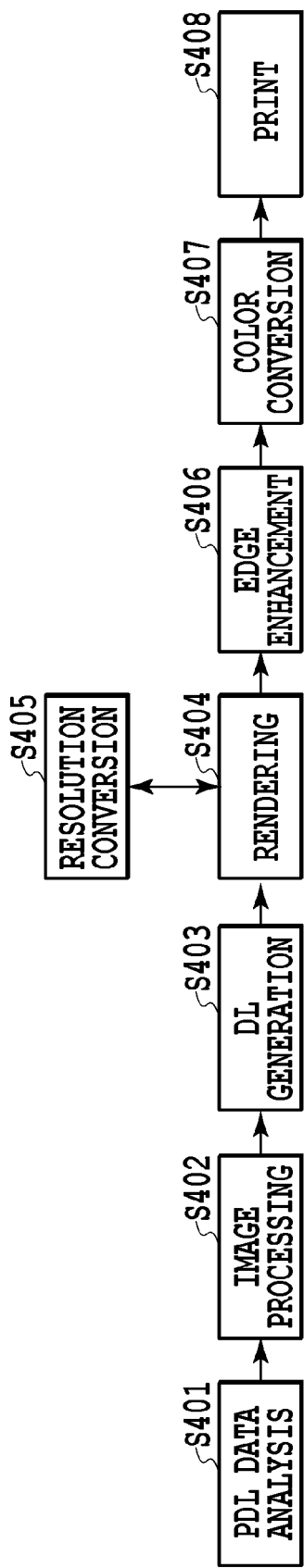
FIG. 3 is a flowchart showing an outline of a conventional flow to process PDL data.

FIG. 2 is a block diagram showing an example of a system configuration of the host computer 103 in the present invention.

As shown in FIG. 2, the host computer 103 includes an HDD 301, a RAM 302, a network I/F 303, and a CPU 304. The host computer 103 may also be any information processing apparatus.

The HDD 301 is a nonvolatile storage medium for storing control codes executed by the CPU 304 in the host computer 103. The HDD 301 includes an OS (Operating System) 310, an application 311, a printer driver 312, an edge enhancement determination unit 313, an edge enhancement processing unit 314, and a compression processing unit 315.

The RAM 302 is a volatile storage medium for temporarily storing various kinds of information.

The network I/F 303 is an interface through which to input and output information from and to the image forming apparatus 101 via the network 102. The network I/F 303 transmits PDL data generated in accordance with the printer driver 312 to the image forming apparatus 101.

The CPU 304 performs arithmetic operation processing performed in the host computer 103.

The OS 310 is software to perform control of the host computer 103. On the OS 310, the application 311 and the printer driver 312 are executed.

The application 311 runs on the OS 310. It is possible for a user to edit documents, presentation materials, photos, etc., using the application 311 and to print a created document.

The printer driver 312 receives drawing data to be printed from the application 311 and generates PDL data.

The CPU 304 functions as the edge enhancement determination unit by reading and executing the control code stored in the edge enhancement determination unit 313 and in the case where drawing data is image data, determines whether or not to perform edge enhancement processing for each image.

The CPU 304 functions as the edge enhancement processing unit by reading and executing the control code stored in the edge enhancement processing unit 314 and performs edge enhancement processing on image data based on the determination result of the edge enhancement determination unit.

The CPU 304 functions as the compression processing unit by reading and executing the control code stored in the compression processing unit 315 and performs compression processing on image data. In the compression processing unit, it is possible to switch between reversible compression, such as LZW, and irreversible compression, such as JPEG, for each piece of image data.

The work memory 320 is used temporarily at the time of performing processing by the application 311 or the printer driver 312.

Figure 4:
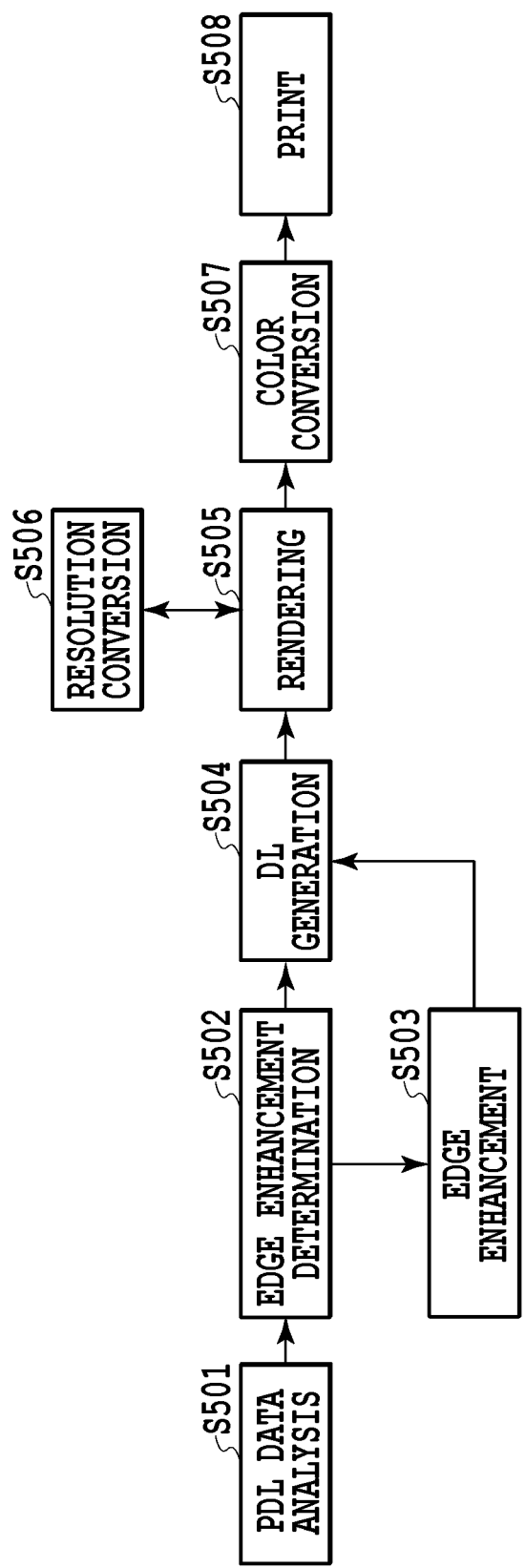
FIG. 4 is a flowchart showing an outline of a processing flow of image data performed in the image forming apparatus 101 in the present invention.

FIG. 4 is a flowchart showing an outline of a processing flow of image data performed in the image forming apparatus 101 in the present invention.

Image data before resolution conversion included in PDL data is analyzed by the PDL analysis unit at step S501 and edge enhancement determination is performed by the edge enhancement determination unit at step S502. The edge of the image data whose edge is determined to be enhanced in accordance with the determination result at step S502 is enhanced by the edge enhancement processing unit at step S503. Next, at step S504, intermediate data for the image data before resolution conversion is generated by the DL generation unit. Next, at step S505, the generated intermediate data is subjected to rendering by the development processing unit. At the time of rendering, the resolution of the image data is converted into the output resolution at step S506. Next, at step S507, the color is converted and at step S508, printing is performed by the printer engine 206.

Embodiment 1

Figure 7:
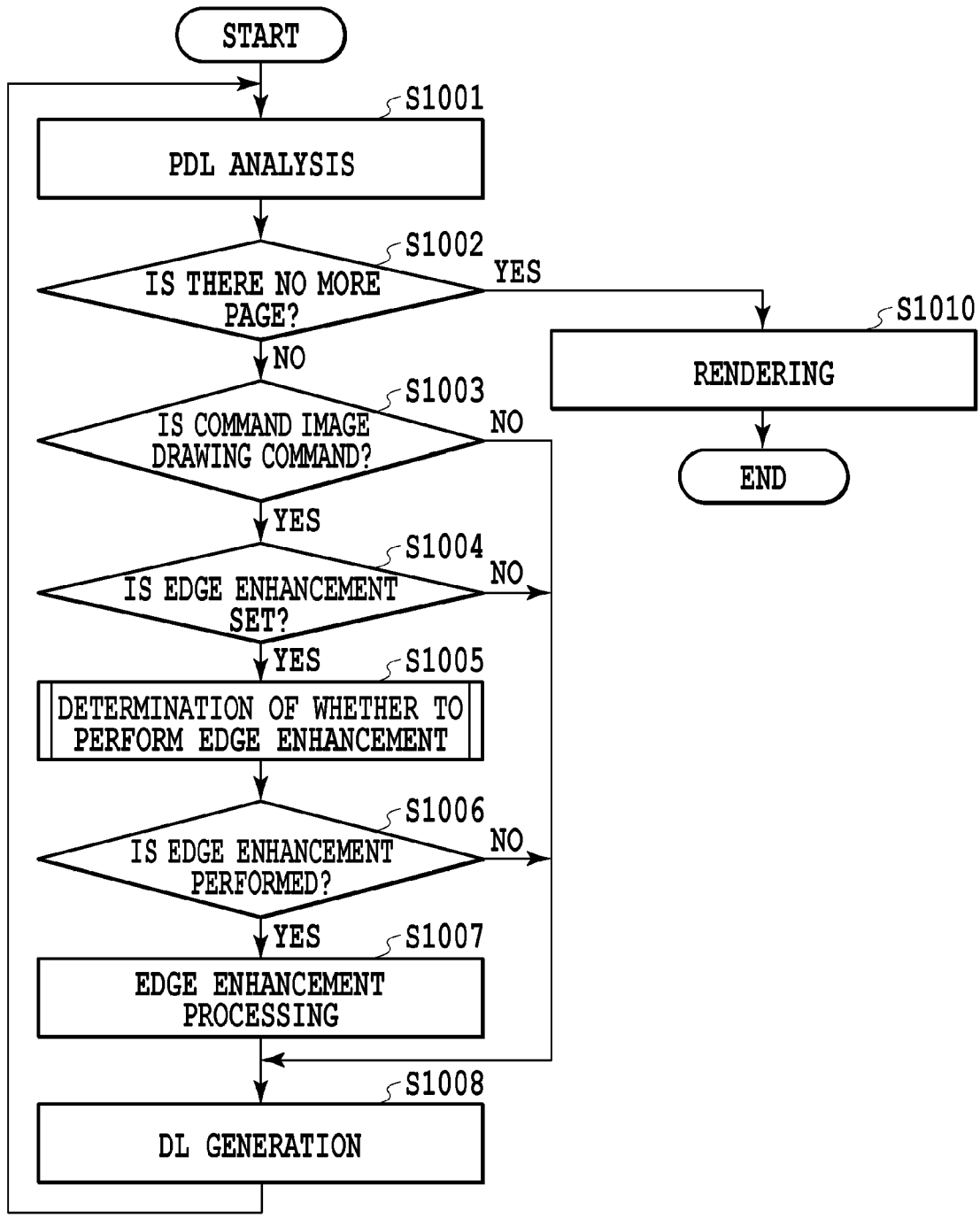
FIG. 7 is a flowchart showing a processing flow of PDL data performed on a CPU 204 according to an embodiment 1.

FIG. 7 is a flowchart showing a processing flow of PDL data performed on the CPU 204 according to the present embodiment.

At step S1001, the CPU 204 that functions as the PDL analysis unit analyzes PDL data transmitted from host computer 103 (step S501 in FIG. 4). Next, the processing proceeds to step S1002.

At step S1002, the CPU 204 determines whether or not the PDL data being analyzed is a page end command. In the case where the PDL data being analyzed is a page end command, the processing proceeds to step S1010. In the case where the PDL data being analyzed is not a page end command, the processing proceeds to step S1003.

At step S1003, the CPU 204 determines whether or not the drawing command within the PDL data is an image drawing command. In the case where the drawing command within the PDL data is an image drawing command, the processing proceeds to step S1004. In the case where the drawing command within the PDL data is not an image drawing command, the processing proceeds to step S1008.

At step S1004, the CPU 204 determines whether or not edge enhancement is set. It is assumed that edge enhancement is set within the PDL data or edge enhancement is set by a user using a panel, not shown, of the image forming apparatus 101. In the case where edge enhancement is set, the processing proceeds to step S1005. In the case where edge enhancement is not set, the processing proceeds to step S1008. In the case where it is determined that edge enhancement is set at step S1004, the processing may proceed to step S1007 without performing the processing at step S1005 and step S1006.

At step S1005, the CPU 204 that functions as the edge enhancement determination unit determines whether or not to perform edge enhancement processing (step S502 in FIG. 4). It may also be possible to determine the degree of intensity of edge enhancement processing at step S1005. For example, it may also be possible to determine whether to perform edge enhancement processing somewhat more strongly or weakly. Next, the processing proceeds to step S1006.

At step S1006, in the case where edge enhancement processing is performed by referring to the determination result at step S1005, the processing proceeds to step S1007 and in the case where edge enhancement processing is not performed, the processing proceeds to step S1008.

At step S1007, the CPU 204 that functions as the edge enhancement processing unit performs edge enhancement processing on the edge part of the image data before the resolution conversion specified in the drawing command (step S503 in FIG. 4). Next, the processing proceeds to step S1008.

At step S1008, the CPU 204 that functions as the DL generation unit generates a DL for image data after the edge enhancement processing (step S504 in FIG. 4). Further, at step S1008, the CPU 204 that functions as the DL generation unit generates a DL also for each piece of data other than the image drawing analyzed by the PDL analysis unit and image data on which edge enhancement processing is not performed. Next, the processing returns to step S1001, and step S1001 to step S1008 are performed repeatedly until it is determined that there is no more page at step S1002.

At step S1010, the CPU 204 that functions as the development processing unit performs rendering on the generated DL (step S505 in FIG. 4) and stores a generated bitmap in the raster memory 223.

Figure 8:
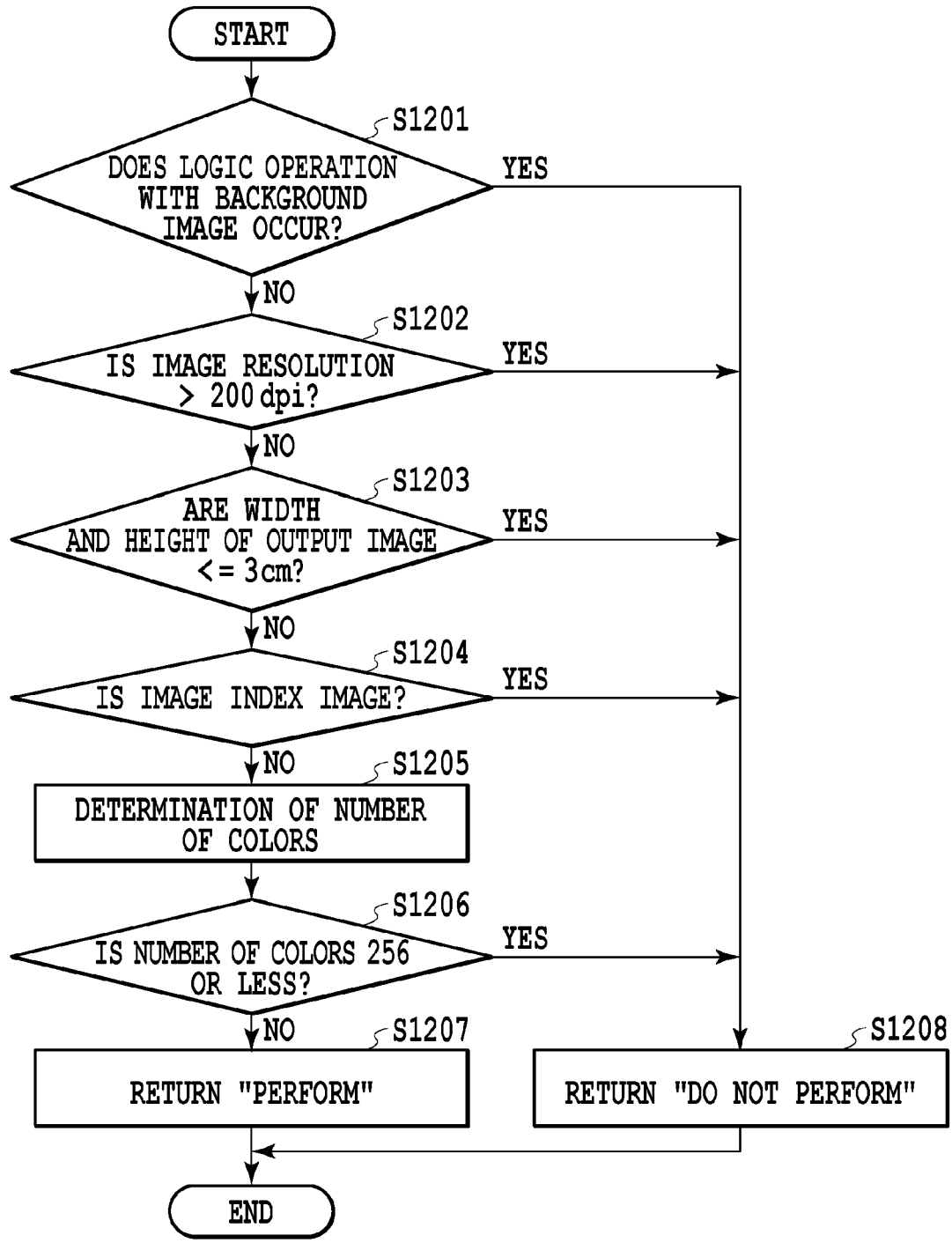
FIG. 8 is a flowchart showing a flow of processing to determine whether to perform edge enhancement according to the embodiment 1.

FIG. 8 is a flowchart showing a flow of processing to determine whether to perform edge enhancement at step S1005 in FIG. 7.

At step S1201, by referring to information of the logic operation (ROP (Raster Operation)) from the drawing command of image drawing, whether or not the arithmetic operation processing with a background (Destination) image occurs is determined. In the case where the arithmetic operation processing with the background image occurs, the processing proceeds to step S1208 and in the case where the arithmetic operation processing with the background image does not occur, the processing proceeds to step S1202.

The reason that edge enhancement processing is not performed in the case where it is determined that the logic operation with the background image is performed at step S1201 is explained below.

Figure 6:
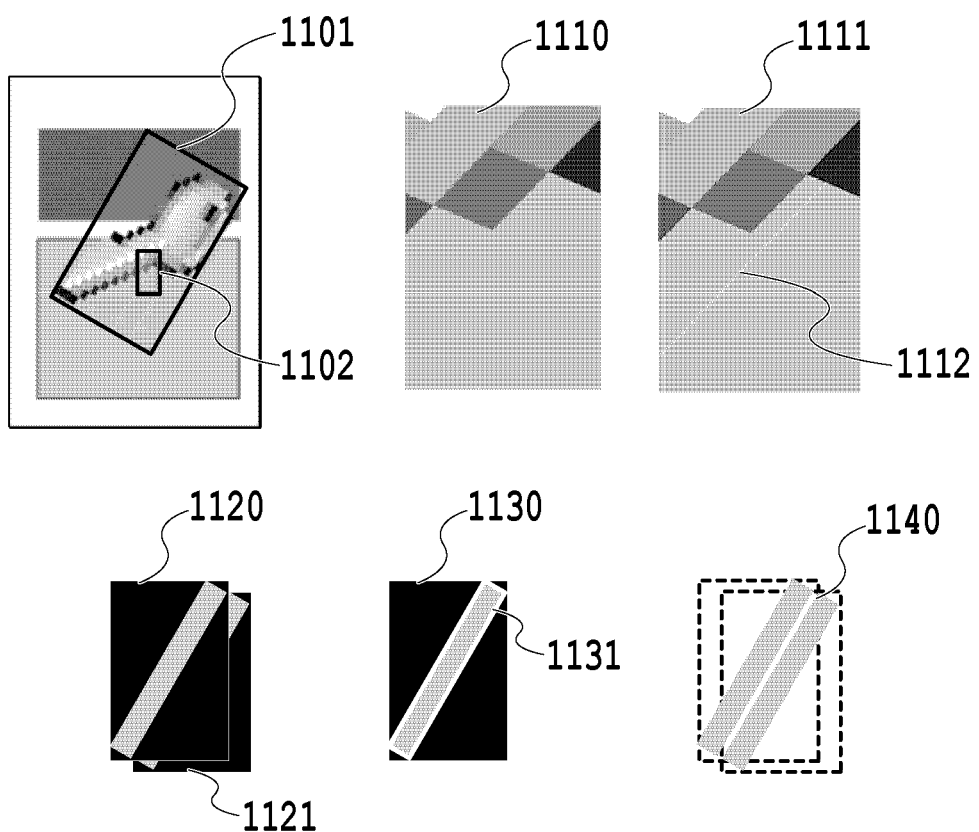
FIG. 6 is a diagram showing an example in which a line not intended by a user is drawn due to edge enhancement processing in the case where an image is drawn by logic drawing.

FIG. 6 is a diagram showing an example in which a line not intended by a user is drawn by edge enhancement processing in the case where an image is drawn by logic drawing. An area 1101 shows an area of image data pasted by an application and rotated arbitrarily. The area 1101 includes an area 1102. An enlarged image 1110 is an enlarge image as the result of printing in the case where edge enhancement processing is not performed on the area 1102. An enlarged image 1111 is an enlarged image as the result of printing in the case where edge enhancement processing is performed on the area 1102. From the enlarged image 1111, it is known that a line 1112 not intended by a user is drawn. Image data 1120 and image data 1121 are image data generated by the application at the time of drawing of the area 1101. The image data 1120 and the image data 1121 respectively become image data 1130 by edge enhancement processing. By the edge enhancement processing, in the image data 1130, an edge portion 1131 is enhanced. In the case where the two pieces of the image data 1130 including the enhanced edge portion 1131 are drawn by OR, the line 1112 not intended by a user is output in a boundary area 1140. Because of this, in the case where an image is drawn by logic drawing or by transmission processing (α blending), the edge enhancement processing is prevented from being performed.

Next, at step S1202, by referring to or calculating the resolution of the image data from the drawing command of image drawing, whether or not the resolution of the image data is higher than 200 dpi is determined. In the case where the resolution of the image data is higher than 200 dpi, the processing proceeds to step S1208 and in the case where the resolution of the image data is 200 dpi or less, the processing proceeds to step S1203. In the case where the drawing command does not include the resolution of the image data, a resolution R of the image data is calculated by an expression below.

$$R = \text{input image size/output image size} * \text{output resolution}$$

The reason that edge enhancement processing is not perform in the case where it is determined that the resolution of the image data is high at step S1202 is explained below.

In the case where the resolution of the image data is low, as the result of converting the resolution into the output resolution (S506 in FIG. 4) by rendering (S505 in FIG. 4), the image after the resolution conversion is blurred. Because of this, in the case where it is necessary to enhance the edge of the image data within the PDL data, but the resolution of the image data is high, the degree in which the edge part is blurred by the conversion into the output resolution is small, and therefore, edge enhancement processing is not performed.

Next, at step S1203, by referring to the output image size from the drawing command of image drawing, whether or not the width and height of the output image are 3 cm or less, respectively, is determined. In the case where the width and height of the output image are 3 cm or less, respectively, the processing proceeds to step S1208 and in the case where the width and height of the output image are greater than 3 cm, respectively, the processing proceeds to step S1204.

At step S1204, by referring to the image format from the drawing command of image drawing, whether or not the image format is the index (pallet) format is determined. In the case where the image format is the index format, the processing proceeds to step S1208 and in the case where the image format is not the index format, the processing proceeds to step S1205.

At step S1205, by referring to the image data from the drawing command of image drawing, the number of colors within the image data is determined. Next, the processing proceeds to step S1206.

At step S1206, by referring to the determination result at step S1205, whether or not the number of colors within the image data is 256 or less is determined. In the case where the number of colors within the image data is 256 or less, the processing proceeds to step S1208 and in the case where the number of colors is larger than 256, the processing proceeds to step S1207.

The reason that edge enhancement processing is not performed in the case where it is determined that the image format is the index format at step S1204 and in the case where it is determined that the number of colors within the image data is small at step S1206 is explained below.

Figure 5:
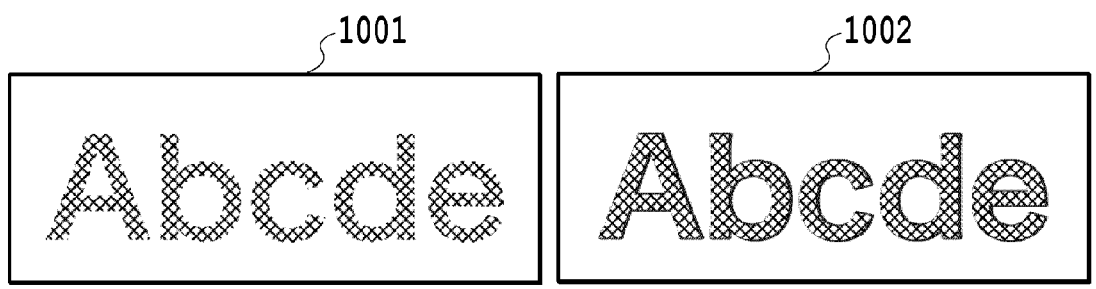
FIG. 5 is a diagram showing an example of image data whose edge portion is enhanced by edge enhancement processing.

FIG. 5 is a diagram showing an example of image data whose edge portion is enhanced by edge enhancement processing. Image data 1001 is image data before edge enhancement processing. Image data 1002 is image data after edge enhancement processing. From the image data 1001 and the image data 1002, it is known that the color of the edge portion of the logo has changed as the result of edge enhancement processing.

The reason for this is that in the case where edge enhancement filtering is performed on, for example, a logo and graphic whose edge of the image data within the PDL data is vivid, the edge becomes more vivid and edge is enhanced excessively.

Next, at step S1207, "Perform" is returned with regard to the edge enhancement processing.

At step S1208, "Do not perform" is returned with regard to the edge enhancement processing. At step S1208, it may also be possible to perform edge enhancement processing in which the degree of enhancement is less than that at step S1207.

In the above-described example, by referring to the information of the ROP, whether or not to perform edge enhancement processing is determined and it is assumed that the same determination is performed also in the case of the drawing processing, such as α drawing, not only in the case of the ROP. Specifically, in the case where the transmittance (α value) is specified at the time of drawing an image, it is possible to determine not to perform edge enhancement processing. The above-described step S1201 to step S1208 are performed respectively by the CPU 204 that functions as the edge enhancement determination unit.

According to the embodiment 1, edge enhancement processing is performed on the image data within the PDL data, and therefore, the effect of the edge enhancement is greater than that in the case where edge enhancement processing is performed on the data converted into the print resolution and it is possible to output a vivid edge.

Embodiment 2

In the embodiment 1, at the time of determination of whether or not to perform edge enhancement processing by the edge enhancement determination unit, determination is performed using the resolution of the image data, which is a fixed value, the output image size, which is a fixed value, and the number of colors within the image data, which is a fixed value. In the present embodiment, the processing to determine whether to perform edge enhancement is performed in accordance with the intensity of edge enhancement specified by a user and this point is a difference from the embodiment 1.

Figure 9:
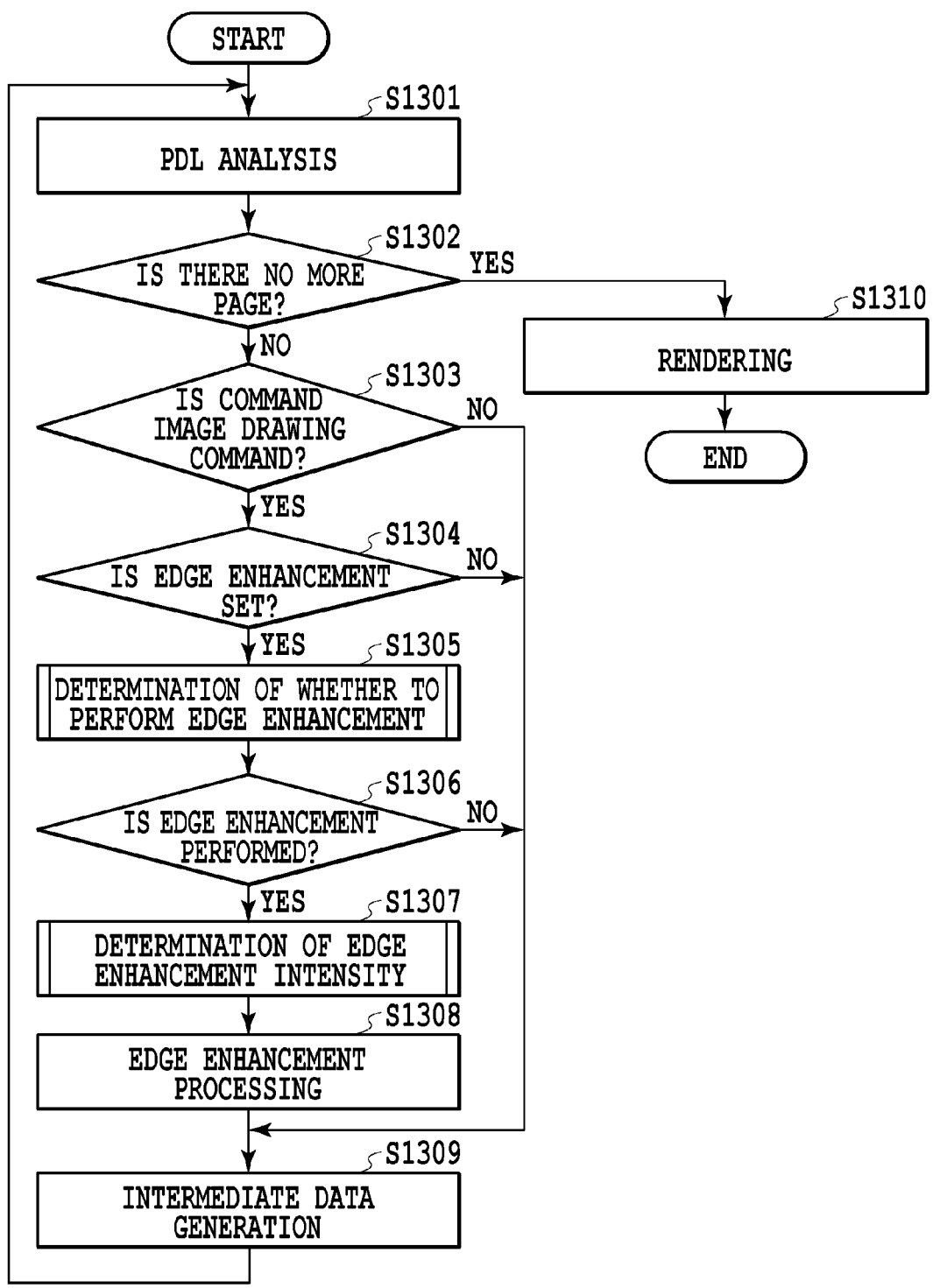
FIG. 9 is a flowchart showing a processing flow of PDL data performed on the CPU 204 according to an embodiment 2.

FIG. 9 is a flowchart showing a processing flow of PDL data performed on the CPU 204 according to the present embodiment.

At step S1301, the CPU 204 that functions as the PDL analysis unit analyzes PDL data transmitted from the host computer 103. Next, the processing proceeds to step S1302.

At step S1302, the CPU 204 determines whether or not the PDL data being analyzed is a page end command. In the case where the PDL data being analyzed is a page end command, the processing proceeds to step S1310. In the case where the PDL data being analyzed is not a page end command, the processing proceeds to step S1303.

At step S1303, the CPU 204 determines whether or not the drawing command within the PDL data is an image drawing command. In the case where the drawing command within the PDL data is an image drawing command, the processing proceeds to step S1304. In the case where the drawing command within the PDL data is not an image drawing command, the processing proceeds to step S1309.

At step S1304, the CPU 204 determines whether or not edge enhancement is set. It is assumed that edge enhancement is set within the PDL data or edge enhancement is set by a user using a panel, not shown, of the image forming apparatus 101. In the case where edge enhancement is set, the processing proceeds to step S1305. In the case where edge enhancement is not set, the processing proceeds to step S1309.

At step S1305, the CPU 204 that functions as the edge enhancement determination unit determines whether or not to perform edge enhancement processing. Next, the processing proceeds to step S1306.

In the case where edge enhancement processing is performed at step S1306 by referring to the determination result at step S1305, the processing proceeds to step S1307 and in the case where edge enhancement processing is not performed, the processing proceeds to step S1309.

At step S1307, the CPU 204 determines the intensity of edge enhancement at the time of performing edge enhancement processing. Next, the processing proceeds to step S1308.

At step S1308, the CPU 204 that functions as the edge enhancement processing unit performs edge enhancement processing on the image data before the resolution conversion specified in the drawing command using the intensity of edge enhancement determined at step S1307. Next, the processing proceeds to step S1309.

At step S1309, the CPU 204 that functions as the DL generation unit generates a DL for image data after the edge enhancement processing. Further, at step S1309, the CPU 204 that functions as the DL generation unit generates a DL also for each piece of data other than the image drawing analyzed by the PDL analysis unit and image data on which edge enhancement processing is not performed. Next, the processing returns to step S1301 and step S1301 to step S1309 are performed repeatedly until it is determined that there is no more page at step S1302.

At step S1310, the CPU 204 that functions as the development processing unit performs rendering on the generated DL and stores a generated bitmap in the raster memory 223.

Figure 10:
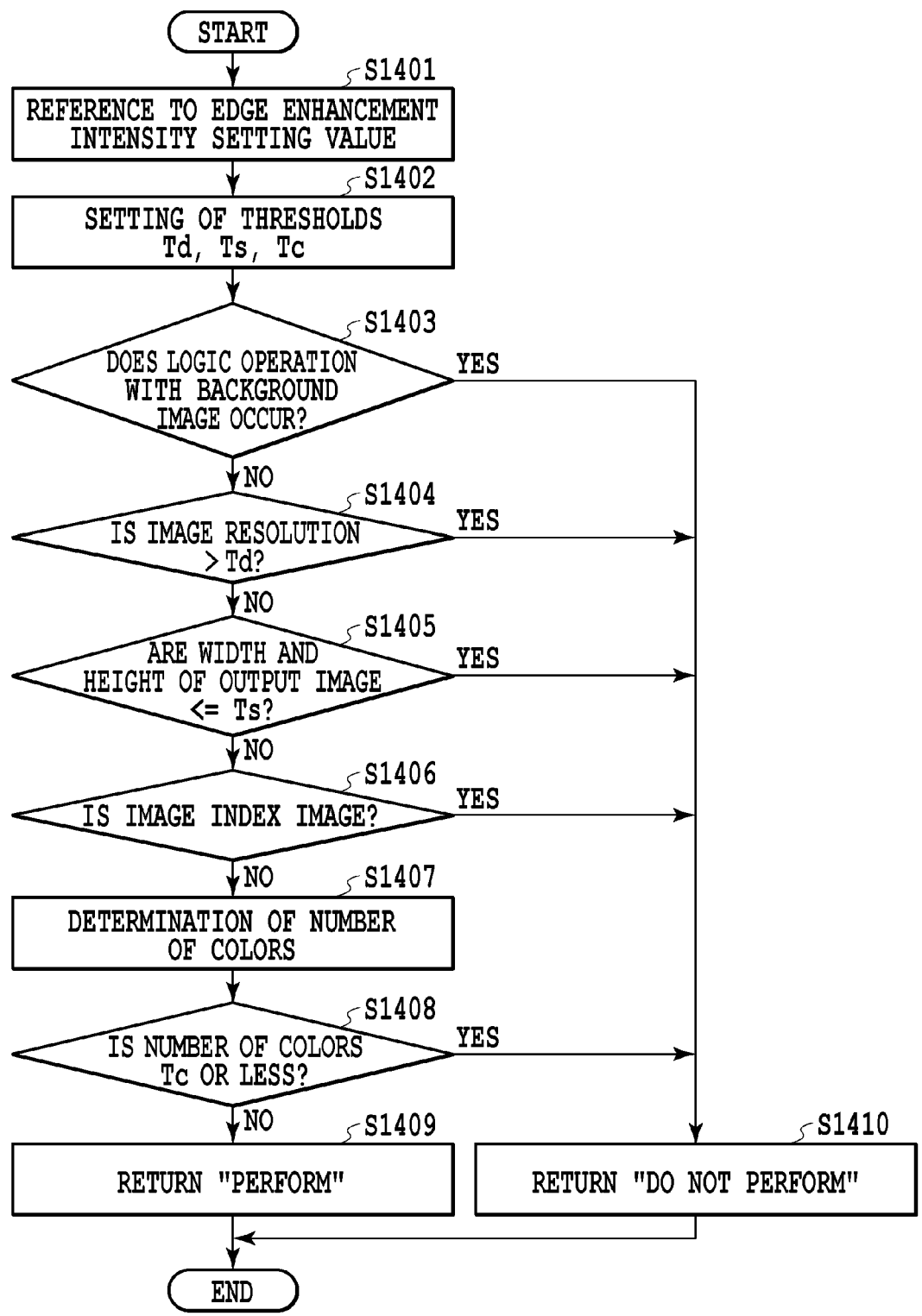
FIG. 10 is a flowchart showing a flow of processing to determine whether to perform edge enhancement according to the embodiment 2.

FIG. 10 is a flowchart showing a flow of processing to determine whether to perform edge enhancement at step S1305 in FIG. 9.

At step S1401, the edge enhancement intensity setting value is referred to and acquired. It is assumed that the edge enhancement intensity is set within the PDL data or is set by a user using a panel, not shown, of the image forming apparatus 101. Next, the processing proceeds to step S1402.

At step S1402, by the edge enhancement intensity setting value, a threshold Td of the resolution of image data, a threshold Ts of the width and height of the output image size, and a threshold Tc of the number of colors within image data are set. FIG. 14 is a diagram showing an example of a table including each threshold for the edge enhancement intensity setting value. In accordance with this table, each threshold is set at step S1402. Next, the processing proceeds to step S1403.

At step S1403, by referring to information of the logic operation (ROP (Raster Operation)) from the drawing command of image drawing, whether or not the arithmetic operation processing with a background image occurs is determined. In the case where the arithmetic operation processing with the background image occurs, the processing proceeds to step S1410 and in the case where the arithmetic operation processing with the background image does not occur, the processing proceeds to step S1404.

At step S1404, by referring to or calculating the resolution of the image data from the drawing command of image drawing, whether or not the resolution of the image data is higher than the threshold Td is determined. In the case where the resolution of the image data is higher than the threshold Td, the processing proceeds to step S1410 and in the case where the resolution of the image data is the threshold Td or less, the processing proceeds to step S1405. In the case where the drawing command does not include the resolution of the image data, the resolution R of the image data is calculated by an expression below.

$$R = \text{input image size}/\text{output image size} * \text{output resolution}$$

At step S1405, by referring to the output image size from the drawing command of image drawing, whether or not the width and height of the output image are the threshold Ts or less, respectively, is determined. In the case where the width and height of the output image are the threshold Ts or less, respectively, the processing proceeds to step S1410 and in the case where at least one of the width and height of the output image is greater than the threshold Ts, the processing proceeds to step S1406.

At step S1406, by referring to the image format from the drawing command of image drawing, whether or not the image format is the index (pallet) format is determined. In the case where the image format is the index format, the processing proceeds to step S1410 and in the case where the image format is not the index format, the processing proceeds to step S1407.

At step S1407, by referring to the image data from the drawing command of image drawing, the number of colors within the image data is determined. Next, the processing proceeds to step S1408.

At step S1408, by referring to the determination result at step S1407, whether or not the number of colors within the image data is the threshold Tc or less is determined. In the case where the number of colors within the image data is the threshold Tc or less, the processing proceeds to step S1410 and in the case where the number of colors within the image data is larger than the threshold Tc, the processing proceeds to step S1409.

At step S1409, "Perform" is returned with regard to the edge enhancement processing.

At step S1410, "Do not perform" is returned with regard to the edge enhancement processing.

In the above-described example, by referring to the information of the ROP, whether or not to perform edge enhancement processing is determined and it is assumed that the same determination is performed also in the case of the drawing processing, such as α drawing, not only in the case of the ROP. The above-described step S1401 to step S1410 are performed respectively by the CPU 204 that functions as the edge enhancement determination unit.

Figure 11:
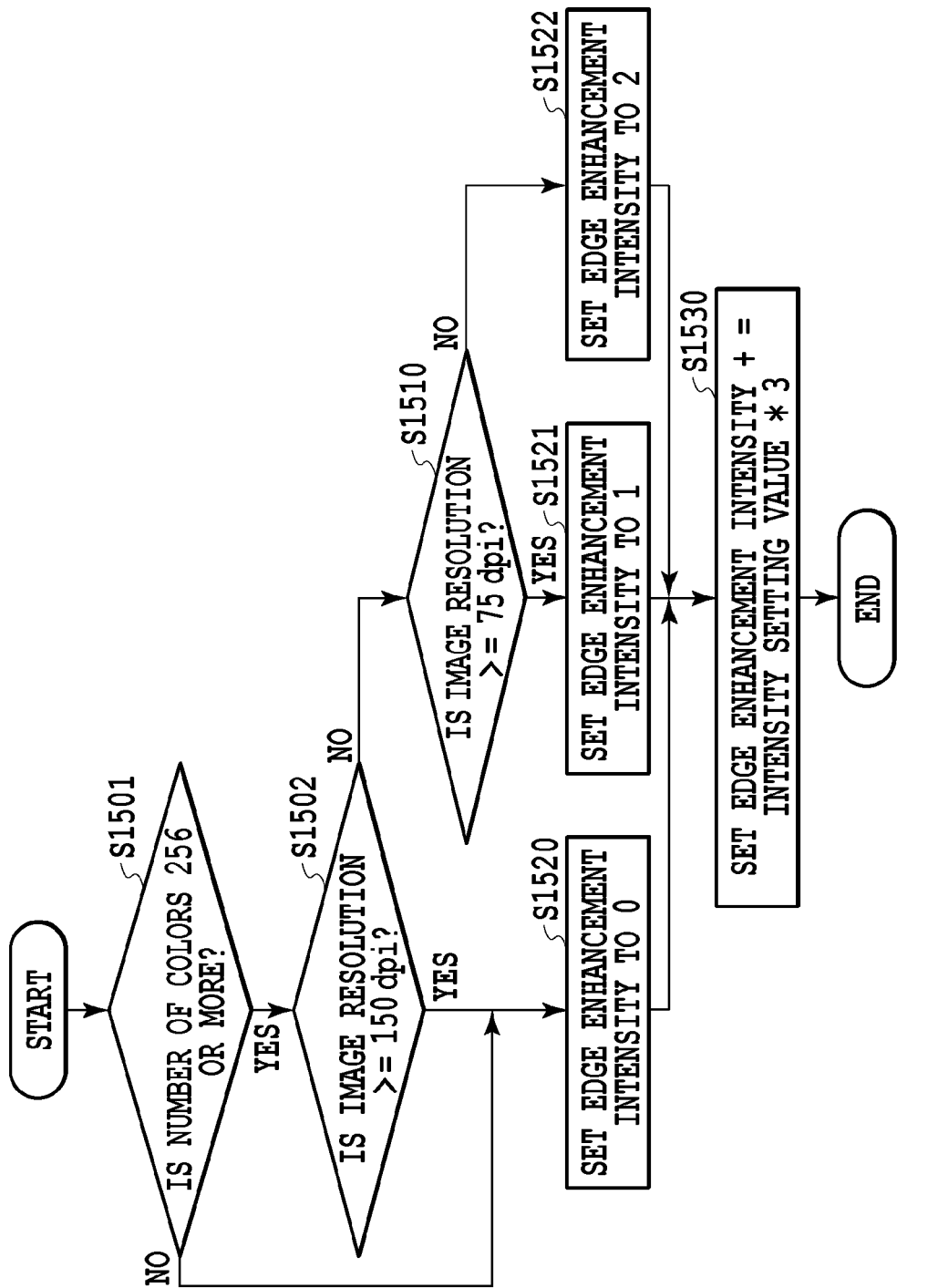
FIG. 11 is a flowchart showing a flow of edge enhancement intensity determination processing according to the embodiment 2.

FIG. 11 is a flowchart showing a flow of the edge enhancement intensity determination processing at step S1307 in FIG. 9.

At step S1501, whether or not the number of colors within the image data is larger than 256 is determined. In the case where the number of colors within the image data is larger than 256, the processing proceeds to step S1502 and in the case where the number of colors in the image data is 256 or less, the processing proceeds to step S1520.

At step S1502, whether or not the resolution of the image data is 150 dpi or higher is determined. In the case where the resolution of the image data is 150 dpi or higher, the processing proceeds to step S1520 and in the case where the resolution of the image data is lower than 150 dip, the processing proceeds to step S1510.

At step S1510, whether or not the resolution of the image data is 75 dpi or higher is determined. In the case where the resolution of the image data is 75 dpi or higher, the processing proceeds to step S1521 and in the case where the resolution of the image data is lower than 75 dpi, the processing proceeds to step S1522.

At step S1520, the edge enhancement intensity is set to 0. Next, the processing proceeds to step S1530.

At step S1521, the edge enhancement intensity is set to 1. Next, the processing proceeds to step S1530.

At step S1522, the edge enhancement intensity is set to 2. Next, the processing proceeds to step S1530.

At step S1530, by referring to the edge enhancement intensity setting value, addition processing is performed on the edge enhancement intensity set at any of step S1520, step S1521, and step S1522 by an expression below.

Edge enhancement intensity+=edge enhancement intensity setting value*3

As described above, it is possible to more appropriately reflect the edge enhancement intensity having taken into consideration the edge enhancement intensity setting value set by a user for each image, and therefore, appropriate output results can be obtained.

Embodiment 3

In the embodiments 1 and 2, the edge enhancement processing is performed in the image forming apparatus 101, however, in the present embodiment, the edge enhancement processing is performed in the host computer 103.

Figure 12:
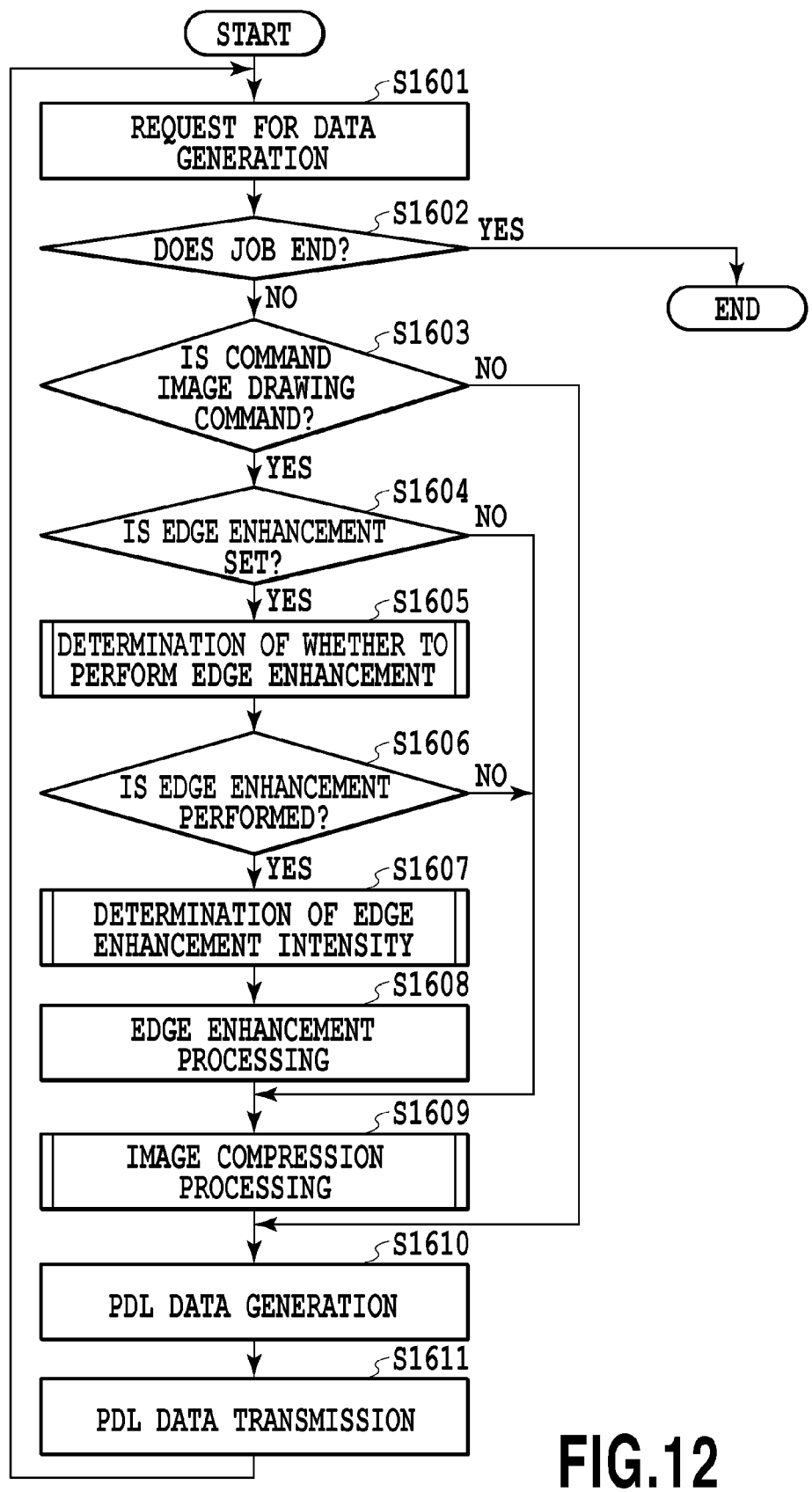
FIG. 12 is a flowchart showing a flow of processing performed by a CPU 304 in accordance with a printer driver 312 according to an embodiment 3.

FIG. 12 is a flowchart showing a flow of processing performed by the CPU 304 in accordance with the printer driver 312 according to the present embodiment.

At step S1601, the CPU 304 receives a request to generate data from the application 311. Next, the processing proceeds to step S1602.

At step S1602, the CPU 304 determines whether or not the job ends. In the case where it is determined that the job ends, the processing is ended and in the case where it is not determined that the job ends, the processing proceeds to step S1603.

At step S1603, the CPU 304 determines whether or not the drawing command is an image drawing command. In the case where the drawing command is an image drawing command, the processing proceeds to step S1604 and in the case where the drawing command is not an image drawing command, the processing proceeds to step S1610.

At step S1604, the CPU 304 determines whether or not edge enhancement is set. It is assumed that edge enhancement is set by a user via a printer driver UI, not shown, of the host computer 103. In the case where edge enhancement is set, the processing proceeds to step S1605. In the case where edge enhancement is not set, the processing proceeds to step S1609.

At step S1605, the CPU 304 that functions as the edge enhancement determination unit determines whether or not to perform edge enhancement processing. Next, the processing proceeds to step S1606.

In the case where edge enhancement processing is performed at step S1606 by referring to the determination result at step S1605, the processing proceeds to step S1607 and in the case where edge enhancement processing is not performed, the processing proceeds to step S1609.

At step S1607, the CPU 304 determines the edge enhancement intensity at the time of performing edge enhancement processing. Next, the processing proceeds to step S1608.

At step S1608, the CPU 304 that functions as the edge enhancement processing unit performs edge enhancement processing on the image data before resolution conversion specified by the drawing command by using the edge enhancement intensity determined at step S1607. Next, the processing proceeds to step S1609.

At step S1609, the CPU 304 that functions as the compression processing unit reduces the data size by performing image compression processing on the image data after edge enhancement processing. Further, at step S1609, the CPU 304 that functions as the compression processing unit reduces the data size by performing image compression processing also on the image data on which edge enhancement processing is not performed. Next, the processing proceeds to step S1610.

At step S1610, the CPU 304 generates PDL data for the image data after the image compression processing. Further, the CPU 304 generates PDL data at step S1610 also for each piece of data other than the image drawing and image data on which edge enhancement processing is not performed in response to the request to generate data received from the application 311. Next, the processing proceeds to step S1611.

At step S1611, the CPU 304 transmits the generated PDL data to the image forming apparatus 101 connected to the network 102 via the network I/F 303. Next, the processing returns to step S1601 and step S1601 to step S1611 are performed repeatedly until it is determined that the job ends at step S1602.

Figure 13:
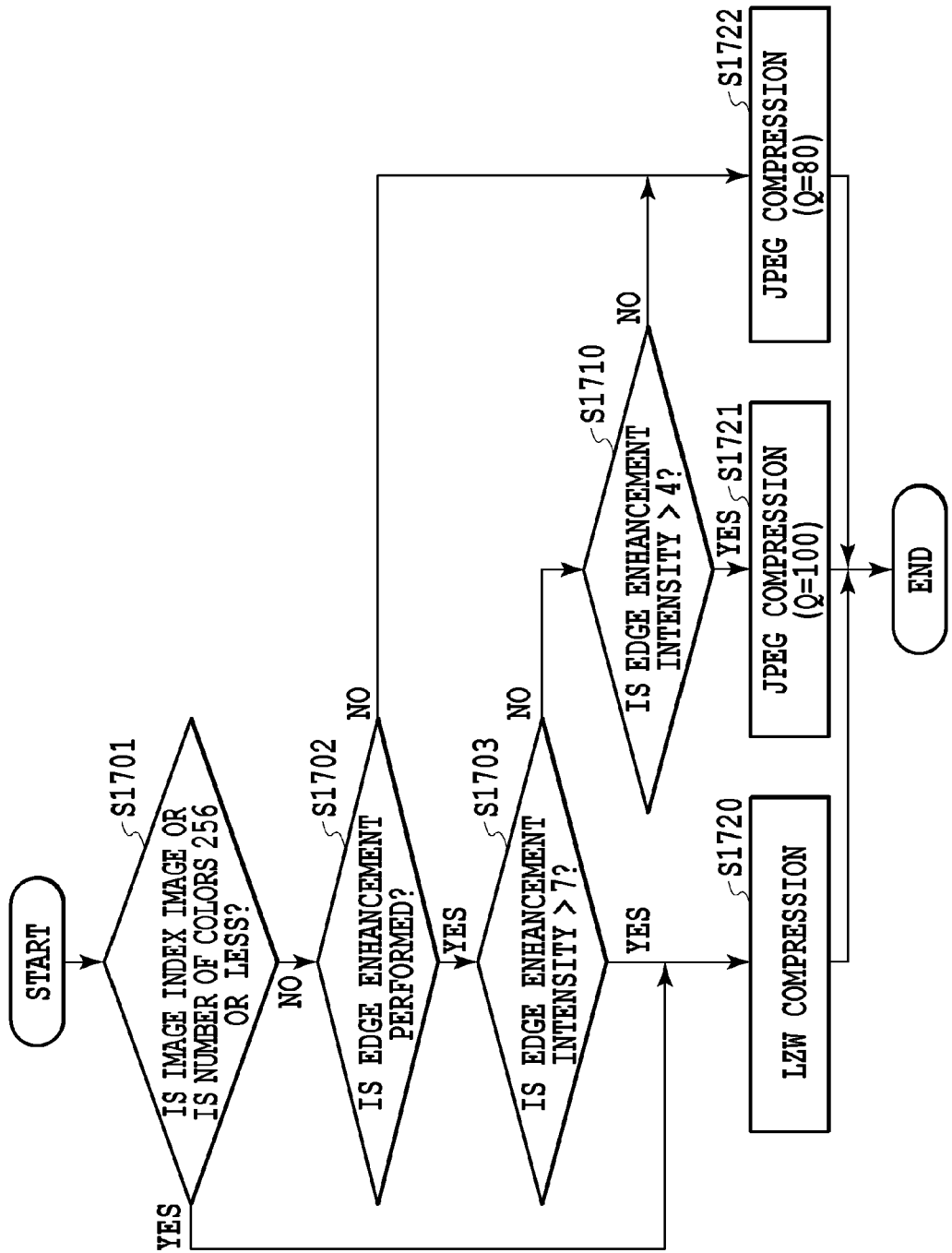
FIG. 13 is a flowchart showing a flow of image compression processing according to the embodiment 3.

FIG. 13 is a flowchart showing a flow of the image compression processing at step S1609 in FIG. 12.

At step S1701, whether or not the image format is the index format and whether or not the number of colors within the image data is 256 or less are determined. In the case where the image format is the index format or in the case where the number of colors within the image data is 256 or less, the processing proceeds to step S1720. In the case where the image format is not the index format and the number of colors within the image data larger than 256, the processing proceeds to step S1702.

At step S1702, whether or not the edge enhancement processing by the edge enhancement processing unit is performed is determined. In the case where the edge enhancement processing is performed, the processing proceeds to step S1703 and in the case where the edge enhancement processing is not performed, the processing proceeds to step S1722.

At step S1703, whether or not the edge enhancement intensity in the edge enhancement processing is greater than is determined. In the case where the edge enhancement intensity in the edge enhancement processing is greater than 7, the processing proceeds to step S1720 and in the case where the edge enhancement intensity in the edge enhancement processing is 7 or less, the processing proceeds to step S1710.

At step S1710, whether or not the edge enhancement intensity in the edge enhancement processing is greater than is determined. In the case where the edge enhancement intensity in the edge enhancement processing is greater than 4, the processing proceeds to step S1721 and in the case where the edge enhancement intensity in the edge enhancement processing is 4 or less, the processing proceeds to step S1722.

At step S1720, LZW compression, which is reversible compression, is performed on the image.

At step S1721, by the JPEG scheme, which is irreversible compression, the image is compressed by a Q value of 100.

At step S1722, by the JPEG scheme, which is irreversible compression, the image is compressed by a Q value of 80.

As described above, by performing the edge enhancement processing in the host computer 103, it is possible to perform the edge enhancement processing at a higher rate. Further, by changing the compression scheme in accordance with the intensity at the time of performing the edge enhancement processing, it is possible to reduce the size of the PDL data without reducing the effect of edge enhancement processing and due to this, it is possible to reduce the data transfer time.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-140528, filed Jul. 4, 2013, No. 2014-125507, filed Jun. 18, 2014, which are hereby incorporated by reference herein in their entirety.

What is claimed is:

1. An image forming apparatus comprising:
a processor and a memory;
an edge enhancement unit configured to enhance an edge portion of image data included in page description language data; and
a rendering unit configured to perform rendering of data generated based on image data that has been subjected to edge enhancement processing by the edge enhancement unit and an analyzing result of the page description language data,
wherein, in a case where the page description language data includes a rendering command of an image using a raster operation with a destination image, edge enhancement for the image data by the edge enhancement unit is reduced compared to the case where the page description language data does not include the rendering command of an image or the edge enhancement processing is not performed by the edge enhancement unit,
wherein, in a case where the page description language data does not include the rendering command of an image using a raster operation with a destination image, the edge enhancement processing is performed on the image data by the edge enhancement unit, and
wherein at least one of the edge enhancement unit and the rendering unit is implemented by the processor and the memory.

2. An image forming apparatus comprising:
a processor and a memory;
a determination unit configured to determine whether to enhance an edge portion of image data for the image data included in page description language data;
an edge enhancement unit configured to enhance an edge portion of the image data in a case where the determination unit determines to enhance the edge portion;
a generation unit configured to generate intermediate data based on image data that has been subjected to edge enhancement processing by the edge enhancement unit and an analyzing result of the page description language data; and
a rendering unit configured to perform rendering of the intermediate data generated by the generation unit,
wherein, in a case where the page description language data includes a rendering command of an image using a raster operation with a destination image, edge enhancement for the image data by the edge enhancement unit is reduced compared to the case where page description language data does not include the rendering command of an image or the edge enhancement processing is not performed by the edge enhancement unit,
wherein, in a case where the page description language data does not include the rendering command of an image using a raster operation with a destination image, the edge enhancement processing is performed on the image data by the edge enhancement unit, and
wherein at least one of the determination unit, the edge enhancement unit, the generation unit, and the rendering unit is implemented by the processor and the memory.

3. The image forming apparatus according to claim 2, wherein, in a case where the page description language data does not include the rendering command of an image using a raster operation with a destination image and transmittance is specified for the image data, the determination unit determines not to enhance the edge portion of the image data or determines to suppress enhancement of the edge portion.

4. The image forming apparatus according to claim 2, wherein, in a case where the page description language data does not include the rendering command of an image using a raster operation with a destination image and a resolution of the image data is higher than a threshold, the determination unit determines to suppress enhancement of the edge portion of the image data.

5. The image forming apparatus according to claim 2, wherein, in a case where the page description language data does not include the rendering command of an image using a raster operation with a destination image and a format of the image data is an index format, or in a case where a number of colors of the image data is smaller than a threshold, the determination unit determines to suppress enhancement of the edge portion of the image data.

6. An image forming method comprising:
an edge enhancement step of enhancing an edge portion of image data included in page description language data in a case where a resolution of the image data is lower than a predetermined resolution; and
a rendering step of performing rendering of data generated based on image data that has been subjected to edge enhancement processing in the edge enhancement step and an analyzing result of the page description language data
wherein, in a case where the page description language data includes a rendering command of an image using a raster operation with a destination image, edge enhancement for the image data in the edge enhancement step is reduced compared to the case where page description language data does not include the rendering command of an image or the edge enhancement processing is not performed in the edge enhancement step,
wherein, in a case where the page description language data does not include the rendering command of an image using a raster operation with a destination image, the edge enhancement processing is performed on the image data in the edge enhancement step.

7. An image processing method comprising:
a determination step of determining whether to enhance an edge portion of image data for the image data included in page description language data;

an edge enhancement step of enhancing an edge portion of the image data in a case where the determination step determines to enhance the edge portion;

a generation step of generating intermediate data based on image data that has been subjected to edge enhancement processing in the edge enhancement step and an analyzing result of the page description language data; and a rendering step of performing rendering of the intermediate data generated in the generation step wherein, in a case where the page description language data includes a rendering command of an image using a raster operation with a destination image, edge enhancement for the image data in the edge enhancement step is reduced compared to the case where page description language data does not include the rendering command of an image or the edge enhancement processing is not performed in the edge enhancement step, wherein, in a case where the page description language data does not include the rendering command of an image using a raster operation with a destination image, the edge enhancement processing is performed on the image data in the edge enhancement step.

8. A non-transitory computer readable storage medium storing a program for causing an image forming method, comprising:

an edge enhancement step of enhancing an edge portion of image data included in page description language data in a case where a resolution of the image data is lower than a predetermined resolution; and a rendering step of performing rendering of data generated based on image data that has been subjected to edge enhancement processing in the edge enhancement step and an analyzing result of the page description language data wherein, in a case where the page description language data includes a rendering command of an image using a raster operation with a destination image, edge enhancement for the image data in the edge enhancement step is reduced compared to the case where page description language data does not include the rendering command of an image or the edge enhancement processing is not performed in the edge enhancement step, wherein, in a case where the page description language data does not include the rendering command of an image using a raster operation with a destination image, the edge enhancement processing is performed on the image data in the edge enhancement step.

* * * * *